(12) United States Patent
Jensen et al.

(10) Patent No.: US 6,471,935 B2
(45) Date of Patent: *Oct. 29, 2002

(54) HYDROGEN STORAGE MATERIALS AND METHOD OF MAKING BY DRY HOMOGENATION

(75) Inventors: Craig M. Jensen, Kailua; Ragaiy A. Zidan, Honolulu, both of HI (US)

(73) Assignee: University of Hawaii, Honolulu, HI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,364

(22) Filed: Jun. 2, 1999

(65) Prior Publication Data

US 2001/0051130 A1 Dec. 13, 2001

Related U.S. Application Data

(60) Provisional application No. 60/095,445, filed on Aug. 6, 1998, and provisional application No. 60/117,310, filed on Jan. 26, 1999.

(51) Int. Cl.$^7$ .................................. C01B 6/84
(52) U.S. Cl. ................ 423/646; 423/658.2; 180/54.1
(58) Field of Search ........................... 423/644, 645, 423/646, 647; 502/414; 180/54.1

(56) References Cited

FOREIGN PATENT DOCUMENTS

| ES | 2138364 | * | 1/2000 | ............. C01B/3/00 |
| WO | WO97/03919 | | 6/1997 | ............. C01B/3/00 |

OTHER PUBLICATIONS

"Ti–doped Alkali Metal Aluminum Hydrides as Potential Novel Reversible Hydrogen Storage Materials", Bogdanovic, et al. Journal of Alloys and Compounds, 253–254, 1997 pp. 1–9.

* cited by examiner

Primary Examiner—Stanley S. Silverman
Assistant Examiner—Maribel Medina
(74) Attorney, Agent, or Firm—Dorsey & Whitney LLP

(57) ABSTRACT

Dry homogenized metal hydrides, in particular aluminum hydride compounds, as a material for reversible hydrogen storage is provided. The reversible hydrogen storage material comprises a dry homogenized material having transition metal catalytic sites on a metal aluminum hydride compound, or mixtures of metal aluminum hydride compounds. A method of making such reversible hydrogen storage materials by dry doping is also provided and comprises the steps of dry homogenizing metal hydrides by mechanical mixing, such as be crushing or ball milling a powder, of a metal aluminum hydride with a transition metal catalyst. In another aspect of the invention, a method of powering a vehicle apparatus with the reversible hydrogen storage material is provided.

12 Claims, 6 Drawing Sheets

HYDROGEN STORAGE MATERIALS AND METHOD OF MAKING BY DRY HOMOGENATION

CROSS REFERENCE TO RELATED APPLICATIONS

This patent application claims the benefit of U.S. provisional patent application Serial No. 60/095,445 filed on Aug. 6, 1998 and U.S. provisional patent application Serial No. 60/117,310 filed on Jan. 26, 1999, the entire disclosures of which are herein incorporated by reference.

GOVERNMENT LICENSE RIGHTS

This invention was made with Government support under Prime Contract No. DE-FC36-94AL85804 awarded by the Department of Energy. The Government has certain rights in this invention.

FIELD OF THE INVENTION

The present invention relates generally to the field of reversible hydrogen storage. More particularly, the present invention relates to a dry homogenized metal hydrides, in particular aluminum hydride compounds, as a material for reversible hydrogen storage, and a method of making the same.

BACKGROUND OF THE INVENTION

For decades, hydrogen has been targeted as the utopian fuel of the future due to its abundance and environmental friendliness. A major difficulty in the utilization of hydrogen as a fuel is the problem of onboard hydrogen storage. High pressure and cryogenic hydrogen storage systems are impractical for vehicular applications due to safety concerns and volumetric constraints. This has prompted an extensive effort to develop solid hydrogen storage systems for vehicular application. Metal hydrides, activated charcoal, and carbon nanotubules have been investigated as hydrogen carriers. For example, $LaNiH_5$ has been investigated but has not proved satisfactory, due in part to its high cost. Unfortunately, despite decades of extensive effort, especially in the area of metal hydrides, no material has been found which has the combination of a high gravimetric hydrogen density, adequate hydrogen dissociation energetics, and low cost required for commercial vehicular applications.

It is known that the dehydrogenation of $NaAlH_4$ is thermodynamically favorable at moderate temperatures. Dehydrogenation is known to occur by a multistep process involving the reactions as shown in equations 1 and 2 below:

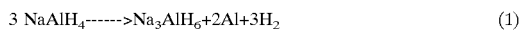
(1)

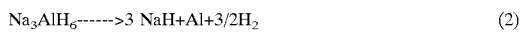
(2)

The process is characterized by very slow kinetics and reversibility only under severe conditions. Thus, $NaAlH_4$ has generally been precluded from consideration as a potential hydrogen storage material despite having a 5.6 weight percentage of hydrogen which is thermodynamically available at moderate temperatures. This thinking has been changed by the recent finding by Bogdanovic and Schwickardi that titanium doping of $NaAlH_4$ enhances the kinetics of hydrogen desorption and renders the dehydriding process reversible under moderate conditions. Bogdanovic found that the onset of the initial dehydriding was lowered by about 50° C. upon titanium wet doping by evaporation of an ether suspension of $NaAlH_4$ which contained 2 mol % of titanium tetra-n-butoxide, $Ti(OBu^n)_4$. This prior art approach however, is subject to many limitations. For example, the temperatures are still relatively high and the reaction kinetics are such that it does not produce a material suitable for practical vehicular applications.

Thus, further development of the kinetics of the dehydriding process is required to produce a material which is suitable for practical vehicular applications. It is of interest to investigate whether further developments in the kinetics of the reversible dehydriding of metallic hydrides, such as $NaAlH_4$ and the like, can be achieved. Further, as the aforementioned discussion demonstrates, the need exists for safe, plentiful, low cost, and effective materials and methods for hydrogen storage and release.

SUMMARY OF THE INVENTION

The present invention provides novel reversible hydrogen storage materials and methods of making said materials, that are readily prepared from cheap, abundant starting materials.

More particularly, the present invention provides a new dry doping method comprising the steps of dry homogenizing metal hydrides by mechanical mixing, such as by crushing or ball milling a powder, of a metal aluminum hydride with a transition metal catalyst. The metal aluminum hydride is of the general formulas of: $X_1AlH_4$, where $X_1$ is an alkali metal; $X_2(AlH_4)_2$, where $X_2$ is an alkaline earth metal; $X_3(AlH_4)_4$, where $X_3$ is Ti, Zr or Hf; $X_4AlH_6$, where $X_4$ is an alkali metal; $X_5(AlH_6)_2$, where $X_5$ is an alkaline earth metal; $X_6(AlH_6)_4$, where $X_6$ is Ti, Zr or Hf; or any combination of the above hydrides.

In another aspect of the present invention, a material for storing and releasing hydrogen is provided, comprising a dry homogenized material having transition metal catalytic sites on a metal aluminum hydride compound, or mixtures of metal aluminum hydride compounds.

The inventors have found that the homogenization method of the present invention of metal aluminum hydrides with transition metal catalysts resulted in a lowering of the dehydriding temperature by as much as 75° C. and markedly improves the cyclable hydrogen capacities. These findings represent a breakthrough in the application of this class of hydrides to hydrogen storage. In particular these findings enable the development of practical hydrogen storage materials and methods for the powering of vehicles, an achievement which has not before been realized.

BRIEF DESCRIPTION OF THE DRAWINGS

These and other objects and advantages of the invention are apparent in reading the description herein, the appended claims, and with reference to the figures, in which:

DESCRIPTION OF THE INVENTION

Figure 1:
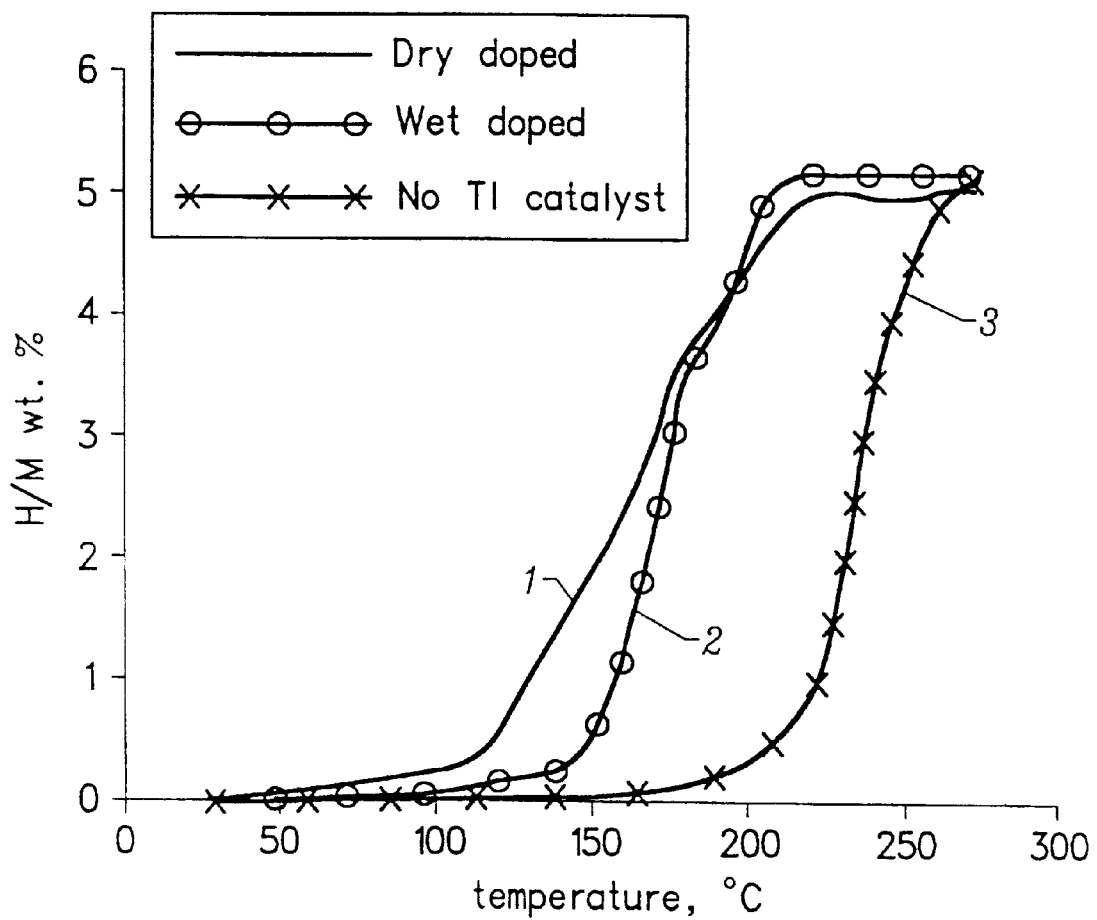
FIG. 1 shows a comparison of thermal desorption (2° C./min) of hydrogen from undoped and wet titanium doped $NaAlH_4$ of the prior art, and one embodiment of the material of the present invention, in this case dry homogenized titanium doped $NaAlH_4$.

Of significant advantage, the present invention provides novel reversible hydrogen storage materials and methods of making said materials, that are readily prepared from cheap, abundant starting materials.

More particularly, the present invention provides a new dry doping method comprising the steps of dry homogenizing metal hydrides by mechanical mixing, such as by crushing or ball milling a powder, of a metal aluminum hydride with a transition metal catalyst. The metal aluminum hydride is of the general formulas of: $X_1AlH_4$, where $X_1$ is an alkali metal; $X_2(AlH_4)_2$, where $X_2$ is an alkaline earth metal; $X_3(AlH_4)_4$, where $X_3$ is Ti, Zr or Hf; $X_4AlH_6$, where $X_4$ is an alkali metal; $X_5(AlH_6)_2$, where $X_5$ is an alkaline earth metal; $X_6(AlH_6)_4$, where $X_6$ is Ti, Zr or Hf; or any combination of the above hydrides.

In another aspect of the present invention, a material for storing and releasing hydrogen is provided, consisting of a dry homogenized material having transition metal catalytic sites on a metal aluminum hydride compound, or mixtures of metal aluminum hydride compounds.

In another aspect of the present invention the hydrogen storage material is used to power a vehicle apparatus, and the novel method further includes the steps of dehydrogenating the dry homogenized hydrogen storage material to release hydrogen, and powering a vehicle apparatus with the released hydrogen.

The material and method of the present invention are quite different from the prior art (in particular Bogdanovic's doped material) and exhibit markedly improved, and unexpected, catalytic effects. The inventors have found that the homogenization method of the present invention of metal aluminum hydrides with transition metal catalysts results in a lowering of the dehydriding temperature by as much as about 75° C. and markedly improves the cyclable hydrogen capacities. These findings represent a breakthrough in the application of this class of hydrides to hydrogen storage. In particular these findings enable the development of practical hydrogen storage materials and methods for the powering of vehicles, an achievement which has not before been practically realized.

As described in the Background, the dehydrogenation of certain metal aluminum hydrides, in particular NaAlH$_4$, are thermodynamically favorable at moderate temperatures. It is known to occur by a multi step process involving the reactions illustrated in equations 1 and 2. While this material has a relatively high percentage of hydrogen, the process exhibits very slow reaction kinetics and is reversible only under severe conditions. An example of severe conditions would be at a pressure of about 175 atmospheres of hydrogen at about 270° C.

In great contrast to the prior art, the dehydrogenation kinetics of NaAlH$_4$ according to the present invention have been enhanced far beyond those previously achieved upon titanium doping of the host hydride. In one exemplary embodiment, homogenization of NaAlH$_4$ with approximately 2 mole % of titanium catalyst, in particular Ti(OBu$^n$)$_4$, under an atmosphere of argon produces a novel material that contains only traces of carbon. Thermal programmed desorption (TPD) measurements show that the dehydrogenation of this material occurs about 30° C. lower than that previously found for NaAlH$_4$ doped with titanium through wet chemistry methods. This lowering of the temperature of dehydrogenation represents a significant advance towards enabling the use of the material as a hydrogen storage material for powering vehicles with hydrogen. The novel titanium containing material can be completely rehydrided under 150 atm of hydrogen pressure at 170° C. In further contrast to the "wet doped" NaAlH$_4$ material, the dehydrogenation kinetics observed for this novel material are undiminished over several dehydriding/hydriding cycles.

More specifically, the present invention provides for doping aluminum hydrides with transition metal catalysts using dry homogenation. Suitable aluminum hydrides which may be practiced with this method are generally of the formulae: $X_1AlH_4$, where $X_1$ is an alkali metal; $X_2(AlH_4)_2$, where $X_2$ is an alkaline earth metal; $X_3(AlH_4)_4$, where $X_3$ is Ti, Zr or Hf; $X_4AlH_6$, where $X_4$ is an alkali metal; $X_5(AlH_6)_2$, where $X_5$ is an alkaline earth metal; $X_6(AlH_6)_4$, where $X_6$ is Ti, Zr or Hf; or any combination of the above hydrides. Examples of such suitable aluminum hydrides include, but are not limited to: sodium aluminum hydride (NaAlH$_3$), sodium aluminum hexahydride (Na$_3$AlH$_6$), magnesium aluminum hydride (Mg(AlH$_4$)$_2$), titanium aluminum hydride (Ti(AlH$_4$)$_4$), zirconium aluminum hydride (Zr(AlH$_4$)$_4$), and the like. The transition metal catalyst used with the present invention include titanium, zirconium, vanadium, iron, cobalt or nickel. Examples of transition metal and lanthanide metal complexes which are suitable catalyst precursors include, but are not limited to Ti(OBu)$_4$, Zr(OPr)$_4$, VO(OPri)$_3$, Fe(acac)$_2$, Co(acac)$_2$, Ni(1,5-cyclooctadiene)$_2$, La(acac)$_3$, and mixtures thereof, where acac is acetylacetonate and Pri is isopropyl. In one preferred embodiment, the hydrogen storage material of the present invention is comprised of NaAlH$_4$ doped by dry homogenation with Ti(OBu$^n$)$_4$ In an alternative preferred embodiment, the hydrogen storage material of the present invention is comprised of NaAlH$_4$ doped with Zr(OPr)$_4$ catalyst by dry homogenation.

According to the present invention, dry homogenation is performed to dope the aluminum hydride with the transition metal catalyst. Homogenation is performed by mechanical methods; such as for example by manual grinding in a mortar and pestle, preferably for about 15 minutes; by mechanically blending in a mixer-grinder mill, preferably for a time in the range of about 5 to 10 minutes; or by balling, preferably for a time in the range of about 5 to 20 minutes. The homogenation process is considered "dry" because the process takes place in the absence of a solvent or any aqueous medium. Preferably, the homogenation process is performed in an inert atmosphere, such as argon, and the like.

The amount of transition metal catalyst used in the dry homogenation process of the present invention is not particularly limited, and is generally selected as that amount useful for providing the desired catalytic activity. For example, to attain a catalytic effect when using a titanium catalyst, at least 0.2 mol % of the titanium precursor is used in the doping of the hydride. The maximum catalytic effect is observed at about 2.0 mol % of the titanium precursor, and the catalytic effect is not improved by doping with greater than 2.0 mol % of the titanium precursor. An illustrated preferred range when doping the hydride with a titanium catalyst is in the range of about 0.5 to about 1 mol % Ti catalyst to aluminum hydride. An illustrated preferred range when doping the hydride with a zirconium catalyst is in the range of about 0.5 to about 1 mol % Zr catalyst to aluminum hydride.

In an exemplary embodiment, $NaAlH_4$ is doped with Ti $(OBun)_4$ in an inert atmosphere according to the method of the present invention to produce an inventive material for storing and releasing hydrogen. The novel titanium containing (dry doped) materials were prepared by adding prescribed amounts of Ti $(OBu^n)_4$ to freshly recrystallized $NaAlH_4$ under an atmosphere of argon. The originally colorless mixtures were homogenized using a mortar and pestle until they became red-violet. This color change suggests that at least some of the Ti4+ was reduced to Ti3+. The resulting paste was visually very distinct from the brown powders obtained through Bogdanovic's procedure for producing titanium containing (wet doped) material. Elemental analysis showed that only trace amounts of carbon are present in the dry homogenized material of the present invention. Evidently, beta-hydride elimination from the alkoxy ligands leads dissociation of the organic groups as butanal from the titanium center and the deposition of a hydrido titanium species on the $NaAlH_4$ host material The presence of nonmetallic titanium on the surface of the novel material has been confirmed through surface x-ray studies. The dry homogenizing method thus creates titanium catalytic sites on the $NaAlH_4$ fresh crushed crystals. Of significant advantage these dry homogenized materials repeatedly store and release hydrogen at obtainable temperatures and modest pressures. In one exemplary embodiment, the dry homogenized method of the present invention results in the release of about 4 to 5.5 weight percent of hydrogen with rapid discharge of hydrogen occurring at a temperature in the range of about 80 to 120° C.

In another exemplary embodiment, the inventors have investigated the dehydriding/rehydriding behavior of $NaAlH_4$ in which a zirconium catalyst was introduced according to the dry homogenation doping method of the present invention. While zirconium was found to enhance the dehydriding kinetics of $NaAlH_4$, the catalytic action is seen to be different than that of titanium. Furthermore, the inventors have found that the differing catalytic effects of titanium and zirconium can be carried out in concert.

TPD measurements were made on the following samples: the dry doped material ("sample 1") of the present invention; the wet doped material of the prior art ("sample 2"); and undoped NaAlH4 ("sample 3") of the prior art. Excellent agreement was found among samples which were prepared at different times. The data obtained for sample 2 was consistent with Bogdanovic's findings. The TPD measurements were made on samples of the three different materials. The plot of the hydrogen weight percentage desorbed as a function of temperature seen in FIG. 1 is based on the integrated TPD data. While the catalytic effect of titanium is evident for both samples 1 and 2, of significant advantage the dehydrogenation temperature of sample 1 is seen to be about 30° C. lower than that of sample 2.

Figure 2:
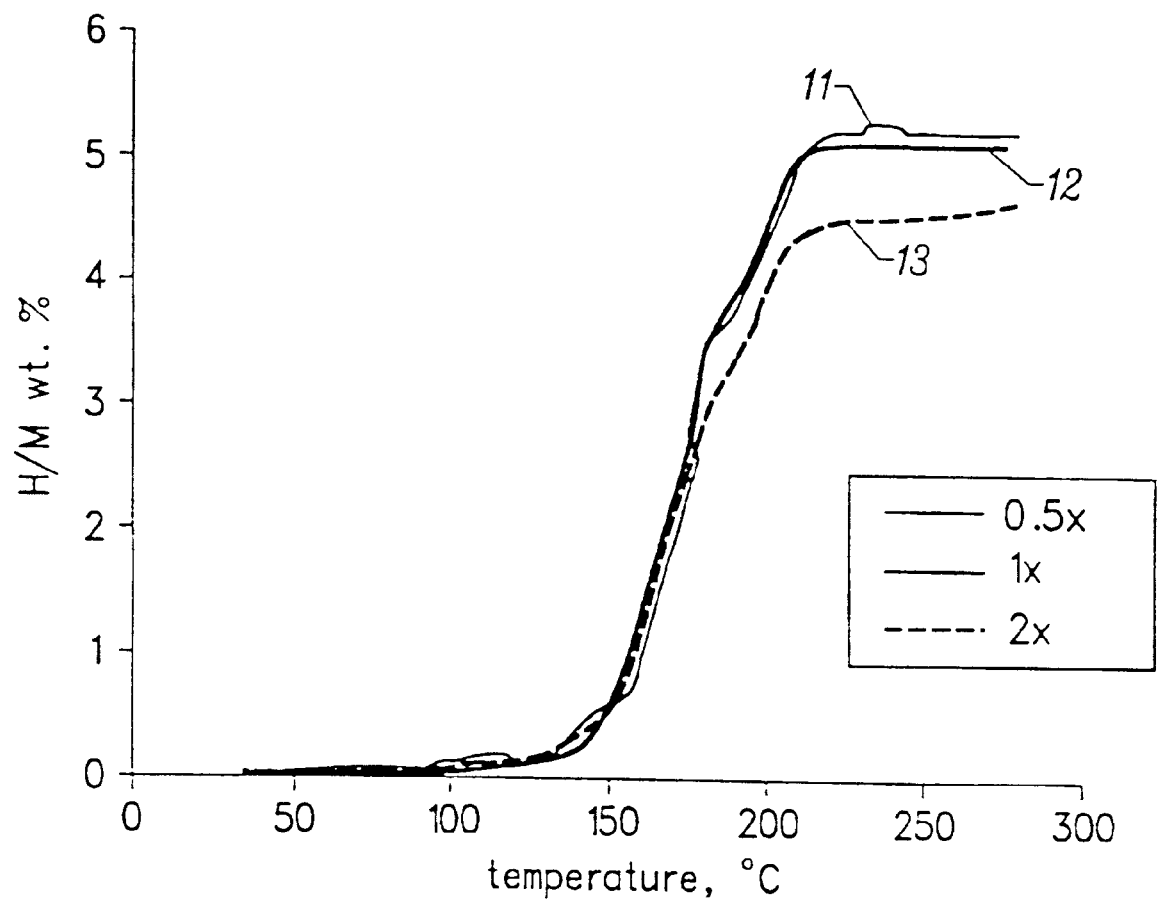
FIG. 2 depicts thermal programmed desorption (2° C./min) of hydrogen from samples of dry titanium doped NaAlH4 material of the present invention prepared from 1, 2 and 4 (0.5×, ×, and 2×) mol of transition metal catalyst $Ti(OBu^n)_4$.

A priori, it seemed possible that the differences observed in the dehydriding behavior of samples 1 and 2 were simply due to variation in the level of titanium loading in the two materials. In order to probe this possibility, independent TPD measurements were made on samples of 1 and 2 that were prepared using 1.0, 2.0, and 4.0 mol % Ti $(OBu^n)_4$, shown as curves 11, 12 and 13, respectively. As seen in FIG. 2, variations in the amount of Ti $(OBu^n)_4$ used in the preparation showed little effect on the dehydrogenation temperature. However, increasing the titanium content of the material does show the gravimetric effect of lowering the H/M weight percent (i.e. the weight of hydrogen evolved per unit weight of the metal aluminum hydride). These results indicate that only a fraction amount of titanium introduced into the materials is catalytically active. Furthermore, there is clearly a significantly larger amount of catalytically active titanium in sample 1 than sample 2. It appears that the dry doping method is more effective than the wet doping method for the generation of the active titanium sites. It is possible that the action of wet doping method is restricted to the surface of the hydride while the dry doping method introduces active titanium sites in the bulk of the material.

Figure 3:
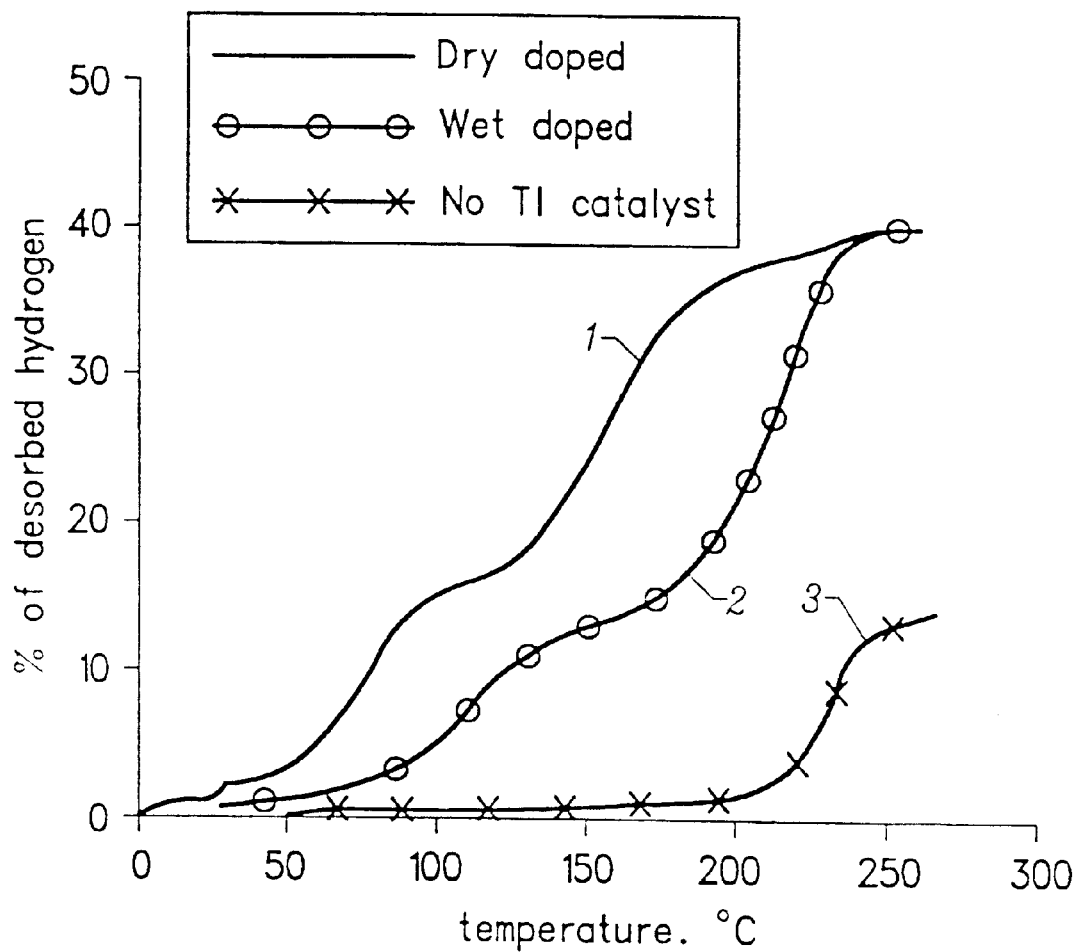
FIG. 3 shows a comparison of thermal programmed desorption (2° C./min) of hydrogen from undoped and wet titanium doped $NaAlH_4$ of the prior art, and one embodiment of the material of the present invention, in this case dry homogenized titanium doped $NaAlH_4$, following one dehydrogenation/rehydrogenation cycle.

Since reversibility is an important requirement for most hydrogen storage applications, the behavior of the samples during repeated cycling was investigated. The sample materials of the present invention were rehydrided under 1600 psi of hydrogen pressure at 200° C. Only about 40% of the hydrogen in the original material is replaced at the moderate hydrogen pressure. TPD measurements were then made on the rehydrided samples. FIG. 3 shows the percentage of hydrogen desorbed from the samples as a function of temperature, considering the desorbed hydrogen at the first cycle to be 100%. The uptake is clearly less than found in the original sample, showing that only partial hydrogenation could be obtained under these conditions. The second dehydriding cycle of sample 1 occurs at nearly the same temperature observed for the first. This sharply contrasts the dehydriding behavior of sample 2 (prior art) for which dehydriding occurs at a significantly higher temperature, closer to that of sample 1, in the second cycle.

The inventors have found that the enhancement of the dehydrogenation kinetics of $NaAlH_4$ upon introduction of titanium to the material is highly sensitive to the doping method. The novel dry doping method of the present invention is much more effective for the generation of catalytically active titanium sites than the wet doping method previously reported. It is also significant that unlike the wet doped material, the kinetic enhancement of the dry doped material is undiminished over several dehydriding/hydriding cycles. The results also indicate that the catalytic effect in the titanium doped material is due to that only a fraction amount of titanium is introduced into the host hydride.

Figure 4:
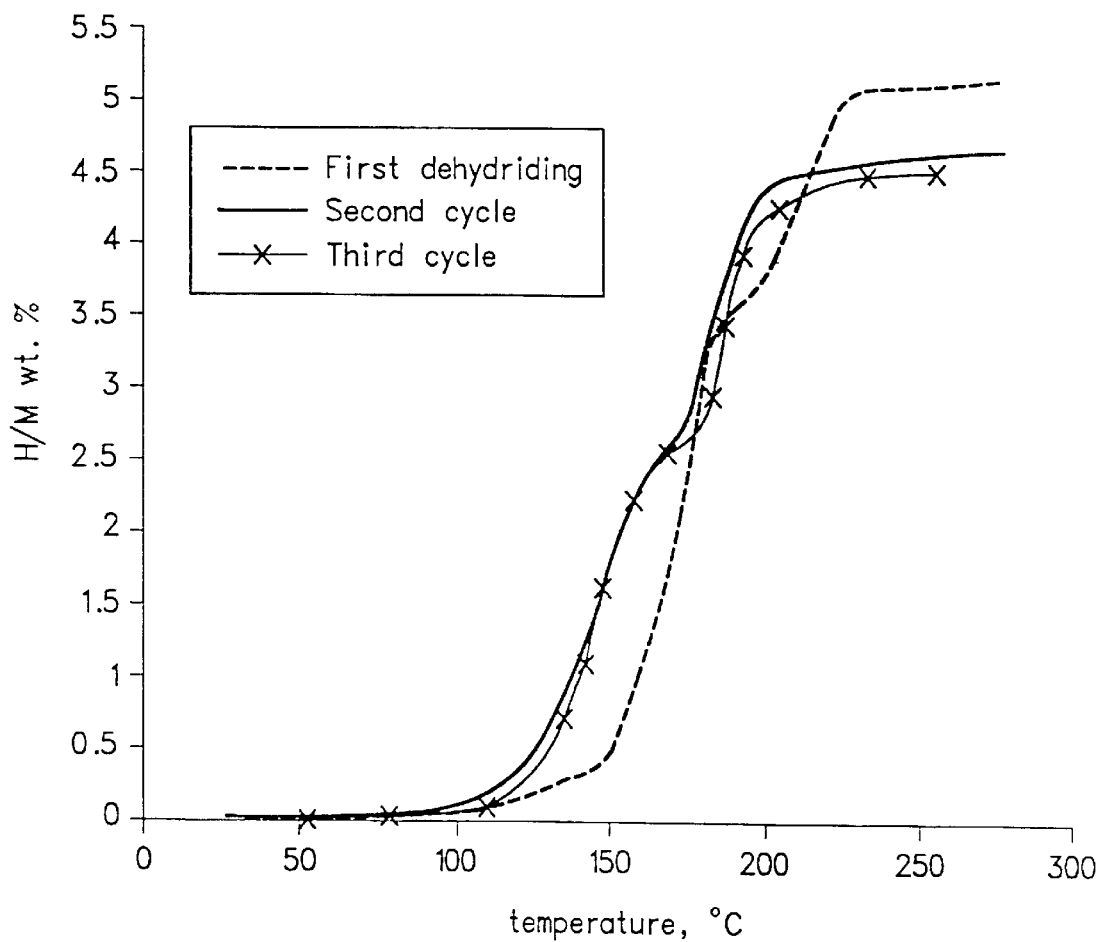
FIG. 4 illustrates the effect of dehydriding/rehydriding cycles on thermal programmed desorption (2° C. min$^{-1}$) of hydrogen from an alternative embodiment of the material of the present invention, in this case NaAlH$_4$ doped with zirconium.

In an alternative exemplary embodiment of the present invention, zirconium doped $NaAlH_4$ was prepared by homogenizing freshly recrystallized hydride with $Zr(OPr)_4$ under an atmosphere of argon. Hydrogen evolution from samples of the zirconium doped hydride was studied by thermal programmed desorption (TPD). Plots of the desorbed hydrogen weight percentage as a function of temperature are illustrated in FIG. 4. The discontinuity in the desorption curves reflects the difference in activation energies of the dehydriding reactions as seen in equations 1 and 2. In contrast to the titanium doped material, the catalytic effect is most pronounced for the dehydriding of $Na_3AlH_6$ to NaH and Al (equation 2) rather than the dehydriding of $NaAlH_4$ to $Na_3AlH_6$ and Al (equation 1). In view of the closely related chemistry of titanium and zirconium, it is surprising that their primary catalytic effects are exerted on different reactions in the dehydriding process.

The rehydriding is also catalyzed by zirconium doping. As observed for titanium doped $NaAlH_4$, recharging of the dehydrided materials can be achieved at 170° C. and 150 atm of hydrogen pressure.

Figure 5:
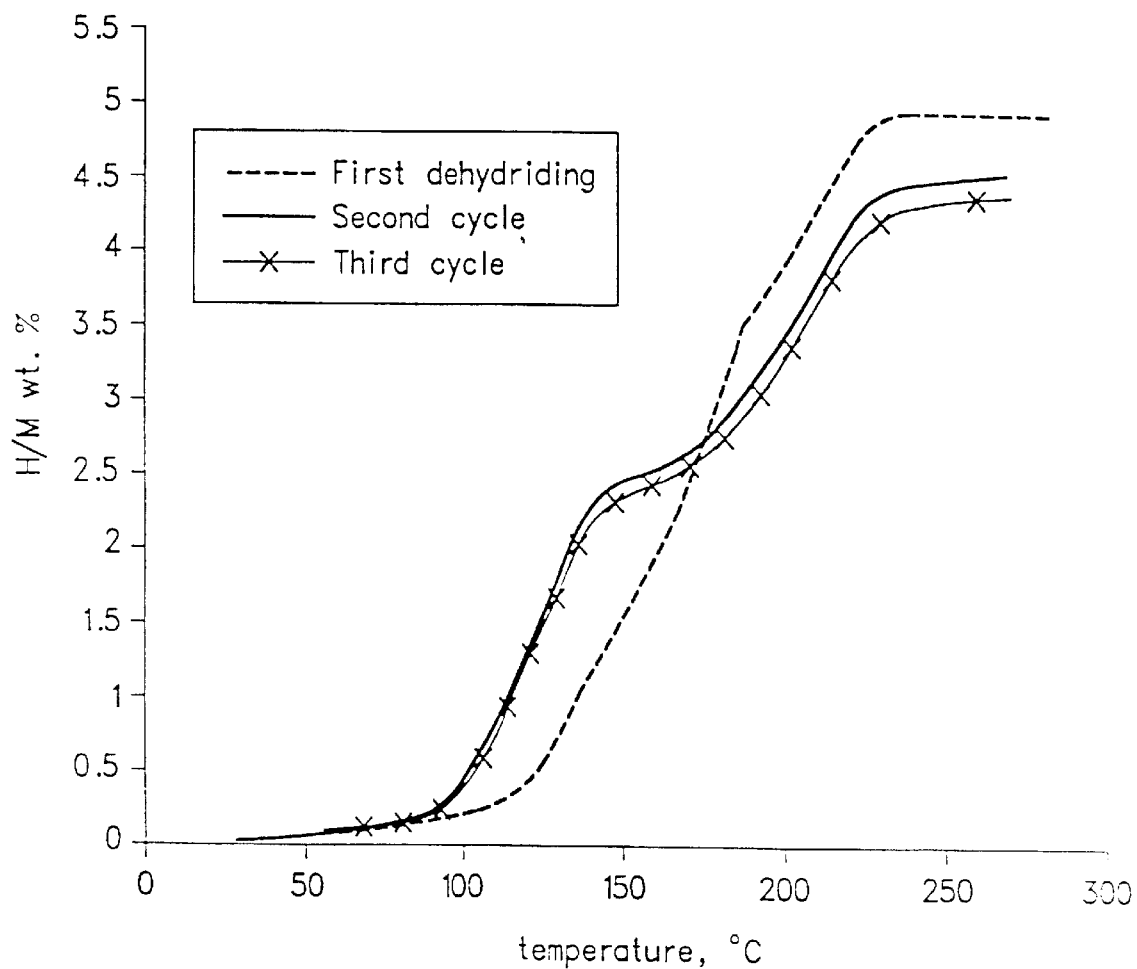
FIG. 5 shows the effect of dehydriding/rehydriding cycles on thermal programmed desorption (2° C. min$^{-1}$) of hydrogen from titanium doped NaAlH$_4$, using the homogenization method of the present invention.

An important aspect of a hydrogen storage material is its ability to perform after repeated dehydriding/rehydriding cycles. Of particular advantage, after the preliminary cycle of dehydriding/rehydriding, the TPD spectra of the zirconium containing materials showed excellent reproducibility. As shown in FIG. 4, the temperature required for dehydriding is consistently 20° C. lower than for the first cycle. Similar behavior was observed in a parallel study of materials doped with 2 mol % titanium through homogenization method of the present invention. As further illustrated in FIG. 5, the temperature required for the dehydriding reactions is lowered by 20° C. after the preliminary dehydriding/rehydriding cycle. The onset of rapid dehydrogenation at 100° C. in the titanium doped material is noteworthy as it suggests the application of these materials as hydrogen carriers for onboard fuel cells.

The hydrogen capacity of these materials drops to 4.5 wt % in the second cycle but is also stabilized by the third cycle. We previously noted similar stabilization of the hydrogen storage capacity in titanium doped $NaAlH_4$ which was prepared through the inventive homogenization technique.

Figure 6:
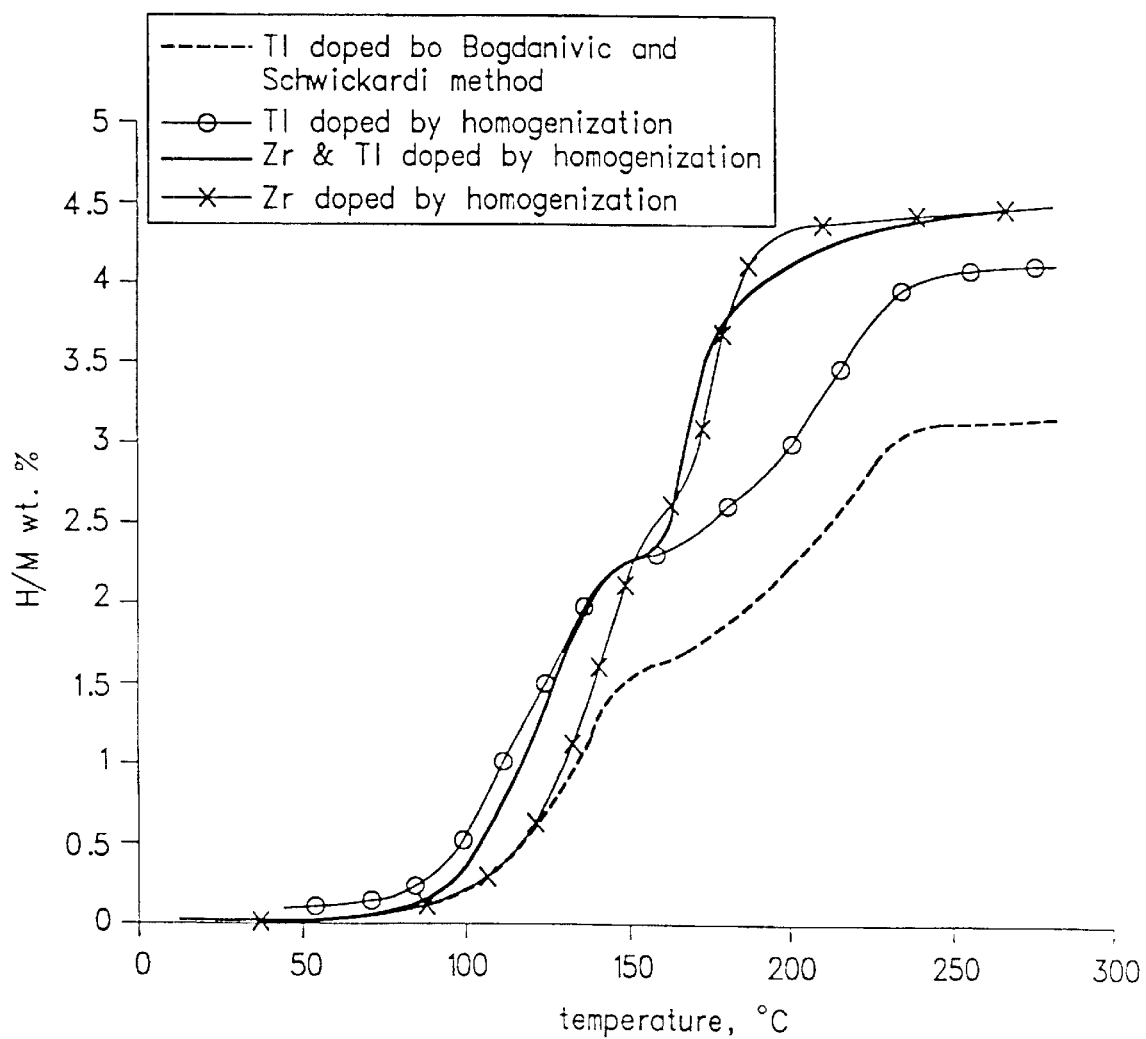
FIG. 6 illustrates the thermal programmed desorption (2° C. min$^{-1}$) of hydrogen from various doped samples of NaAlH$_4$ according to the present invention after three cycles of dehydriding/rehydriding.

The chain of advancement in the development of metal catalyzed $NaAlH_4$ is illustrated by comparison of the TPD spectra of the third dehydriding cycle of variety of doped materials. As shown in FIG. 6, hydride which was doped with titanium through the method of Bogdanovic has a cyclable hydrogen capacity of 3.2 wt %. Titanium doping through the homogenization method of the present invention significantly enhances the kinetics of the first dehydriding reaction and improves the cyclable hydrogen capacity to 4.0 wt %. The zirconium doped material shows enhancement of the kinetics of the second dehydriding reaction and a further improved cyclable hydrogen capacity of 4.5 wt %. However, the kinetics of the first dehydriding reaction in the Zr doped material are inferior to those of the titanium doped material of the present invention.

In order to determine the compatibility of the catalytic action of zirconium and titanium according to the present invention, a sample was prepared in which $NaAlH_4$ homogenized with 1 mol % of both $Zr(OPr)_4$ and $Ti(OBu^n)_4$. The sample was then stabilized by three dehydriding/rehydriding cycles. With further reference to FIG. 6, it is shown that the TPD spectrum of the titanium/zirconium doped material is a virtual superposition of the first segment of the curve for the titanium doped material and the second segment of the zirconium doped material. Thus, titanium and zirconium can act in concert to optimize the dehydriding/rehydriding behavior of $NaAlH_4$.

The inventors have found that the dehydriding kinetics of $NaAlH_4$ are significantly enhanced through zirconium doping. While zirconium is inferior to titanium as a catalyst for the dehydriding of $NaAlH_4$ to $Na_3AlH_6$ and Al, it is a superior catalyst for the dehydriding of $Na_3AlH_6$ to NaH and Al. The benefit of both catalytic effects can be realized in materials containing a combination of both titanium zirconium catalysts. After the initial dehydriding/rehydriding cycle, $NaAlH_4$ which is doped with titanium and/or zirconium is stabilized with a greater than 4 wt % cyclable hydrogen. Finally, the occurrence of rapid dehydriding in the titanium containing materials at temperatures below 100° C. suggests their application as hydrogen carriers for onboard fuel cells.

Experimental

The following experiments are provided for illustration purposes only and are not intended to limit the present invention in any way.

Experiments in General

All reactions and operations were performed under argon in a glove box or using standard Schlenk techniques with oxygen and water free solvents. Sodium aluminum hydride, $NaAlH_4$, was purchased from Aldrich Chemical Inc. and recrystallized from THF/pentane before use. $Ti(OBu^n)_4$ was used as purchased from Strem Chemical Inc. "Wet" titanium doped $NaAlH_4$ was prepared from the evaporation of an ether suspension of $NaAlH_4$ that contained 2 mol of $Ti(OBu^n)_4$ as previously described by Bogdanovic. The elemental analysis was performed by Oneida Research Services Inc., Whitesboro, N.Y.

The Titanium Loped Material

In a glove box, $NaAlH_4$ (0.54 g, 10 mol) was combined with $Ti(OBu^n)_4$ (0.26 mL, 0.76 mol). The mixture was homogenized a using mortar and pestle for 15 minutes until a red-violet paste was produced. Elemental analysis of the resulting material showed its composition to be C, 0.25%; H, 7.01%. Samples were also prepared through this procedure using 0.13 mL (0.38 mol) and 0.52 mL (1.52 mol) of $Ti(OBu^n)_4$.

A thermovolumetric analyzer (TVA), based on a modified Sievert's type apparatus, was used to characterize the gas-solid interaction between hydrogen and the sodium aluminum hydride systems. The TVA consisted of two high pressure stainless steel Parr reactors (Model 452HC-T316), one used to hold the sample and the other as a gas reservoir, between which very small precisely measured volumes of hydrogen may be transferred. The sample vessel contained an aluminum insert with two narrow cylindrical cavities. A K-type thermocouple was placed inside each of the cavities. One of the cavities contained the sample and the other was used as a temperature reference. The sample cavity was designed to insure intimate contact between the aluminum insert and the sample. This, together with the high thermal conductivity of the insert served to minimize temperature fluctuations within the sample resulting from the heat of reaction or rapid pressure change. The entire sample vessel could be heated and cooled using a PID programmable controller unit that allows sample temperatures to be controlled and programmed to change between 196 and 673° K. In order to reach 196° K., the entire sample vessel was placed inside a container surrounded by a mixture of dry ice and acetone.

Hydrogen pressures inside the vessels were measured using high precision pressure transducers. Different size aluminum inserts were available to adjust the dead volume above the sample, allowing total pressure and pressure changes to be maintained within the range and precision of our instrumentation as sample size and hydrogen loading varied. The volumes of the sample vessel and gas reservoir and the gas flows between them were calibrated using hydrogen and argon.

The gas system was constructed using high purity regulators, a VCR sealed manifold capable of operating under vacuum or at elevated pressure, diaphragm type shut-off valves, and micro valves to control gas flows between reactors. The gas lines and vessels were tested on regular basis for inboard or outboard gas leaks. System temperatures and pressures were recorded using a high data acquisition system together with a software developed for this task.

The rates of hydrogen desorption for each of the three samples were measured using a thermal programmed desorption (TPD) technique. A sample of about 0.5 grams was weighted, and loaded into the high pressure reactor under argon atmosphere. The samples were then heated from room temperature to 280° C. at a rate of 2° C. per minute while maintaining low hydrogen over pressure in the sealed reactor. The rate of hydrogen desorption was measured as a function of temperature. On selected samples, the TPD measurements were repeated to insure the reproducibility of the samples and the measurements.

Reagents

All reactions and operations were performed under argon in a glove box. $NaAlH_4$ and zirconium tetra-n-propoxide, $Zr(OPr)_4$ (70 wt. % in propanol solution) were purchased from Aldrich Chemical Inc. $NaAlH_4$ was recrystallized from THF/pentane using standard Schlenk techniques with oxygen and water free solvents. $Ti(OBu^n)_4$ was used as purchased from Strem Chemical Inc.

Zirconium and Titanium Doped Materials

In a glove box, $NaAlH_4$ (0.54 g, 10 mmol) was combined with 94 µL of a 70 wt % solution of $Zr(OPr)_4$ in propanol. Homogenized samples were prepared by first manual mixing with a mortar and pestle for 5 minutes and then mechanical blending with a Wig-L-Bug electric grinder/mixer for 15 minutes. Titanium doped samples were similarly prepared using $Ti(OBu^n)_4$ (70 µL 0.20 mmol). Titanium/zirconium doped hydride was homogenized with 0.047 mL of a 70 wt % solution of $Zr(OPr)_4$ and $Ti(OBu^n)_4$ (35 µL, 0.10 mmol).

Thermal Programmed Desorption (TPD) Measurements

The gas-solid interaction between hydrogen and the sodium aluminum hydride systems were characterized using a thermovolumetric analyzer (TVA), based on a modified Sievert's type apparatus. The TVA system contained a high pressure reactor vessel with a PID programmable temperature controller unit. Hydrogen pressures inside the vessels were measured using high precision pressure transducers. Different size aluminum inserts were available to adjust the dead volume above the sample, allowing total pressures and pressure changes to be maintained within the range and precision of our instrumentation as sample size and hydrogen loading varied. The volumes of the sample vessel and gas reservoir and the gas flows between them were calibrated using hydrogen and argon. The gas system was constructed using high purity regulators, a VCR sealed manifold capable of operating under vacuum or at elevated pressure, diaphragm type shut-off valves, and micro-valves to control gas flows between reactors. The gas lines and vessels were tested on a regular basis for gas leaks. System temperatures and pressures were recorded using a high precision 16-bit National Instruments data acquisition system together with software developed for this task.

The hydrogen desorption behavior of the samples was monitored as a function of temperature using a thermal programmed desorption (TPD) spectrum technique. Samples (≈0.5 grams) were loaded into the high pressure reactor under argon atmosphere and heated from room temperature to 280° C. at a rate of 2° C. per minute while maintaining low hydrogen overpressure in the sealed reactor. On selected samples, the TPD measurements were repeated to insure the reproducibility of the samples and the measurements.

In summary the foregoing description and figures demonstrate the development of new and advanced materials useful as reversible hydrogen storage materials and methods of making the same. Of significant advantage, the dehyriding and rehydriding of such materials occur under conditions that enable their use as hydrogen storage materials in vehicular applications. Other features and advantages of the present invention may be apparent to a person of skill in the art who studies the present invention disclosure. The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

We claim:

1. A method of making a hydrogen storage material, comprising the steps of:
   providing a sodium aluminum hydride compound;
   providing a transition metal compound comprised of titanium, zirconium and mixtures thereof as a catalyst; and
   mechanically homogenizing said sodium aluminum hydride compound with said transition metal compound in a dry environment to produce a dry mechanically homogenized hydrogen storage material having active transition metal catalytic sites on the sodium aluminum hydride compound such that said hydrogen storage material maintains cyclable hydrogen capacity of greater than 4 wt %.

2. The method of claim 1 wherein said mechanically homogenizing step is carried out in an inert atmosphere.

3. The method of claim 1 wherein said sodium aluminum hydride is $NaAlH_4$ and said transition metal catalyst is $Ti(OBu^n)_4$.

4. The method of claim 1 wherein said sodium aluminum hydride is $NaAlH_4$ and said transition metal catalyst is $Zr(OPr)_4$.

5. A method for the reversible storage of hydrogen characterized in that sodium aluminum hydrides are subjected to a dehydriding/rehydriding process and said process is enhanced by mechanically homogenizing sodium aluminum hydrides with zirconium compounds or mixtures of zirconium and titanium compounds in a dry environment;
   dehydriding the hydrogen storage material which, maintains dehydrogenation at a temperature of less than 100° C. and a cyclable hydrogen capacity of 4.0 wt. % and above.

6. A material for storing and releasing hydrogen, comprising:
   a dry homogenized material having dry, mechanically homogenized doped transition metal catalytic sites on an aluminum hydride compound, said material maintaining cyclable hydrogen capacity of about 4.0 wt. % and above.

7. The material of claim 6 wherein said transition metal catalytic sites have a composition selected from the group consisting of titanium, zirconium, and mixtures thereof.

8. The material of claim 6 wherein said dry mechanically homogenized material is titanium doped $NaAlH_4$.

9. The material of claim 6 wherein said dry mechanically homogenized material is zirconium doped $NaAlH_4$.

10. The material of claim 6 wherein said dry mechanically homogenized material is titanium and zirconium doped $NaAlH_4$.

11. The material of claim 6 wherein said dry mechanically homogenized material exhibits dehydrogenation at a temperature of less than 100° C.

12. The method of powering a vehicle apparatus comprising the steps of:

providing a sodium aluminum hydride compound, providing a transition metal compound comprised of titanium, zirconium and mixtures thereof as a catalyst, mechanically homogenizing said sodium aluminum hydride compound with said transition metal compound in a dry environment to produce a dry mechanically homogenized hydrogen storage material having active transition metal catalytic sites on the sodium aluminum hydride compound such that said hydrogen storage material maintains cyclable hydrogen capacity of greater than 4 wt %, dehydrogenating said dry mechanically homogenized hydrogen storage material to release hydrogen, and powering a vehicle with the released hydrogen.

* * * * *